United States Patent [19]
Asano et al.

[11] Patent Number: 5,529,255
[45] Date of Patent: Jun. 25, 1996

[54] BRAKE DEVICE FOR FISHING REEL

[75] Inventors: Shinichi Asano, Chiba; Takeo Miyazaki, Tokyo, both of Japan

[73] Assignee: Daiwa Seiko, Inc., Tokyo, Japan

[21] Appl. No.: 391,349

[22] Filed: Feb. 21, 1995

[30] Foreign Application Priority Data

Feb. 23, 1994 [JP] Japan .................................. 6-002374 U

[51] Int. Cl.$^6$ ........................................................ A01K 89/033
[52] U.S. Cl. ............................ 242/268; 242/283; 242/319
[58] Field of Search .................................... 242/238, 267, 242/268, 319

[56] References Cited

U.S. PATENT DOCUMENTS 4,223,854  9/1980  Karlsson .................................. 242/268
5,163,636  11/1992  Sato ...................................... 242/319 X

FOREIGN PATENT DOCUMENTS 3-114964  11/1991  Japan .
5-10612   3/1993   Japan .

*Primary Examiner*—Daniel P. Stodola
*Assistant Examiner*—William A. Rivera
*Attorney, Agent, or Firm*—Longacre & White

[57] ABSTRACT

A brake device for a fishing reel which covers a threaded portion of a handle shaft between a handle and an adjusting member to prevent entry of foreign matters. A cylindrical portion is formed on an adjusting member, which is threadedly engaged with a handle shaft to rotationally adjust the drag brake force. The cylindrical portion extends from the adjusting member 4 and is received by an annular recessed portion formed in a handle which is mounted on the outer end portion of the handle shaft. The threaded portion of the handle shaft between the handle and adjusting member is surely covered with the cylindrical portion.

5 Claims, 4 Drawing Sheets

BRAKE DEVICE FOR FISHING REEL

BACKGROUND OF THE INVENTION

1. Field of the Invention

The present invention relates to an improved brake device for applying a brake force to a spool of a fishing reel.

2. Description of the Prior Art

In a conventional fishing reel, as disclosed in Japanese Utility Model Publication No. Hei. 5-10612 and Japanese Utility Model Publication No. Hei. 3-114964, there is employed a brake device in which a brake member is depressed by means of an adjusting member which is in threaded engagement with a handle shaft to adjust the brake force of a drive gear in frictional connection with the handle shaft and to apply the adjusted brake force to a spool provided in the fishing reel.

FIG. 6 shows a sectional plan view of the main portions of a conventional double-bearing type fishing reel with such brake device.

In the double bearing type reel shown in FIG. 6, two support plates 61 and 70 are formed in an integrally connected manner by a plurality of props, two outer side plates 62 and 71 are respectively fixed to the outsides of the two support plates 61 and 70, and a spool 72 is interposed between the two support plates 61 and 70 in such a manner that it can be freely rotated by means of a spool shaft 63. The spool shaft 63 is rotatably supported by a bearing 73 on the support plate 61 and a bearing (not shown) on the outer plate 71. A pinion 64 is slidably fitted on a portion of the spool shaft 63 so as to be engaged with and disengaged from the portion of the spool shaft 63 by means of clutches 63a and 64a respectively formed on the spool shaft 63 and the pinion 64.

A drive gear 74 in mesh with the pinion 64 is fitted on the outer periphery of a handle shaft 65. Brake members such as a friction plate 75, a rotation preventive pressure plate 76, drag force adjusting plates 77, 78, a spring receiving plate 79, a bearing 80 and the like included in a drag mechanism are fitted sequentially on a portion of the handle shaft 65 existing on the outer side of the drive gear 74. A collar is fitted on the outer side of the above portion in a rotation preventive manner. If the above drag mechanism is pressed by means of a drag adjusting handle 67 in threaded engagement with the handle shaft 65, then the drag brake can be adjusted.

The handle shaft 65 is supported not only by a bearing 82 having its two outer peripheral portions fitted into a recessed potion formed in the support plate 61 but also by a bearing 80 fitted into a hole formed in cylindrical portion 83 fixed to the outer plate 62. A handle 84 is fitted on a portion of the handle shaft 65 existing on the outside of the threaded portion for the drag adjusting handle 67 and is prevented against removal from the handle shaft 65 by a screw 85.

However, in the above-mentioned conventional fishing reels, if the drag adjusting handle (or an adjusting member) 67 in threaded engagement with the handle shaft 65 is rotated and moved in the axial direction to thereby press against the drag mechanism, then a gap B is formed between the handle 84 and the drag adjusting handle (adjusting member) 67.

In actual fishing, the fishing reel is used under a severe environment in which seawater, refuse, sand and the like are easy to get into the reel and, therefore, the seawater, refuse, sand and the like are easy to get into and stick to the threaded portion 87 of the handle shaft 65 through the gap B, which causes an adverse effect on the rotative performance of the drag adjusting handle (adjusting member) 67. Consequently, the brake force cannot be adjusted smoothly and the appearance of the reel can be impaired.

SUMMARY OF THE INVENTION

Accordingly, it is an object of the invention to provide a brake device for a fishing reel which, even when it is used in a severe fishing environment, prevents entrance of seawater, refuse, sand and the like by means of a simple structure to thereby maintain the smooth operation for adjusting the brake force.

In order to attain the above-noted and other objects, the invention provides a brake device for a fishing reel in which a spool rotatably supported on a reel main body can be rotated in a fishline winding manner by means of a drive gear frictionally connected by a brake member to a handle shaft. The handle shaft is rotatably supported on the reel main body and on the outer end of which a handle can be mounted. The brake member is depressed against the drive gear by an adjusting member in threaded engagement with the handle shaft to thereby be able to adjust the brake force of the drive gear. One of the handle and adjusting member includes a cylindrical portion which is extended axially therefrom, whereas the other includes an annular recessed portion into which the cylindrical portion can be fitted. Thus, the cylindrical portion covers the outer peripheral surface of the handle shaft between the handle and adjusting member to prevent the same from being exposed.

According to the invention, one of the handle mounted on the outer end portion of the handle shaft and the adjusting member in threaded engagement with the handle shaft is so arranged as to include a cylindrical portion extended axially therefrom, the other is so arranged as to include an annular recessed portion, and the cylindrical portion is fitted into the annular recessed portion. Thus, the exposed portion of the outer peripheral surface of the handle shaft between the handle and the adjusting member can be covered by the cylindrical portion with completeness.

BRIEF DESCRIPTION OF THE DRAWINGS

FIGS. 5A and 5B show a brake device for a fishing reel according to a third embodiment of the invention wherein FIG. 5A is an enlarged plan view of the main portions of the third embodiment, and FIG. 5B is a perspective view of a cylindrical member employed in the third embodiment.

DETAILED DESCRIPTION OF THE PREFERRED EMBODIMENTS

Preferred embodiment of the present invention will now be described in detail with reference to the drawings attached hereto.

Figure 1:
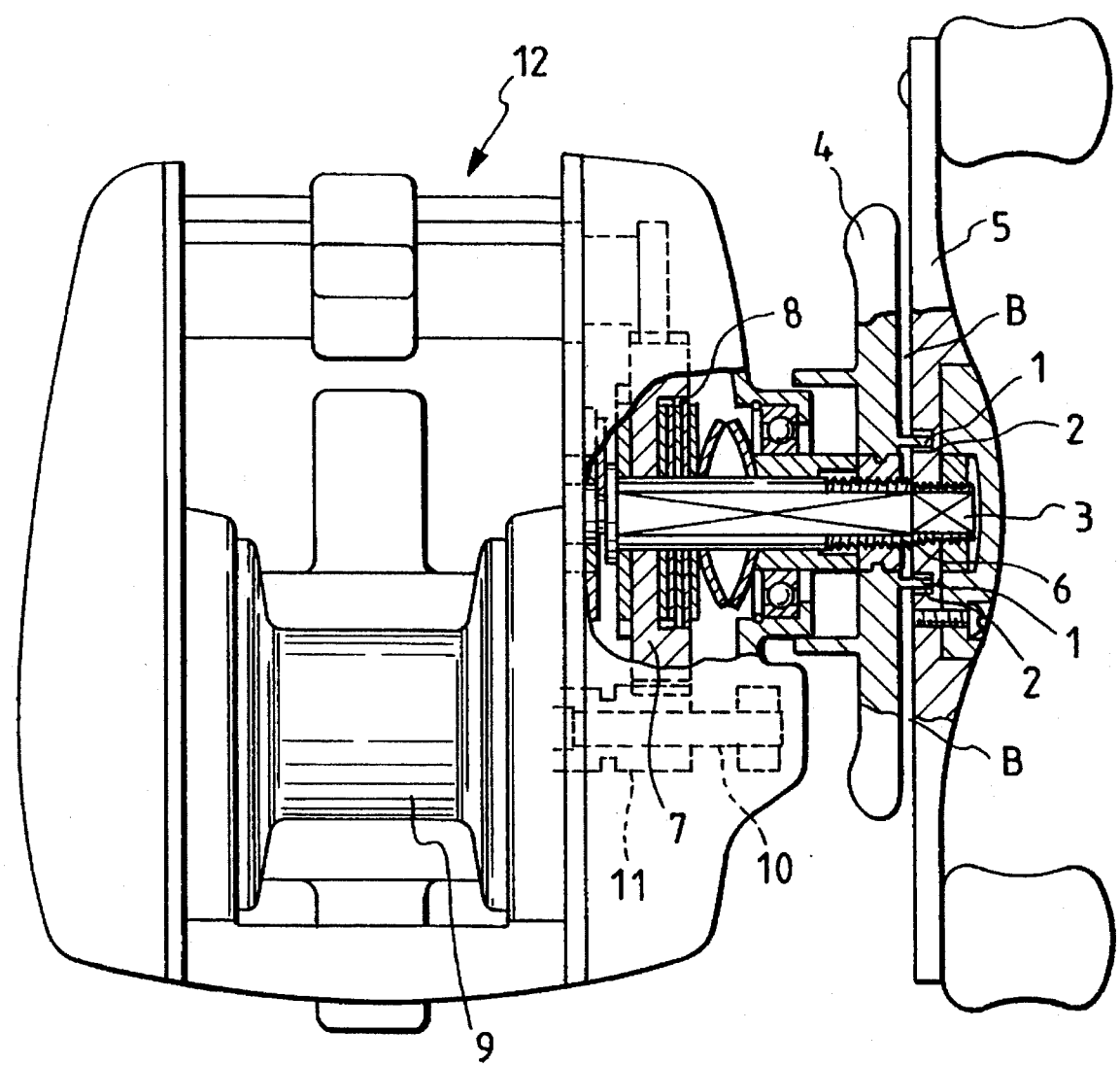
FIG. 1 is a sectional plan view of the main portions of a brake device for a fishing reel according to a first embodiment the invention.
Figure 2:
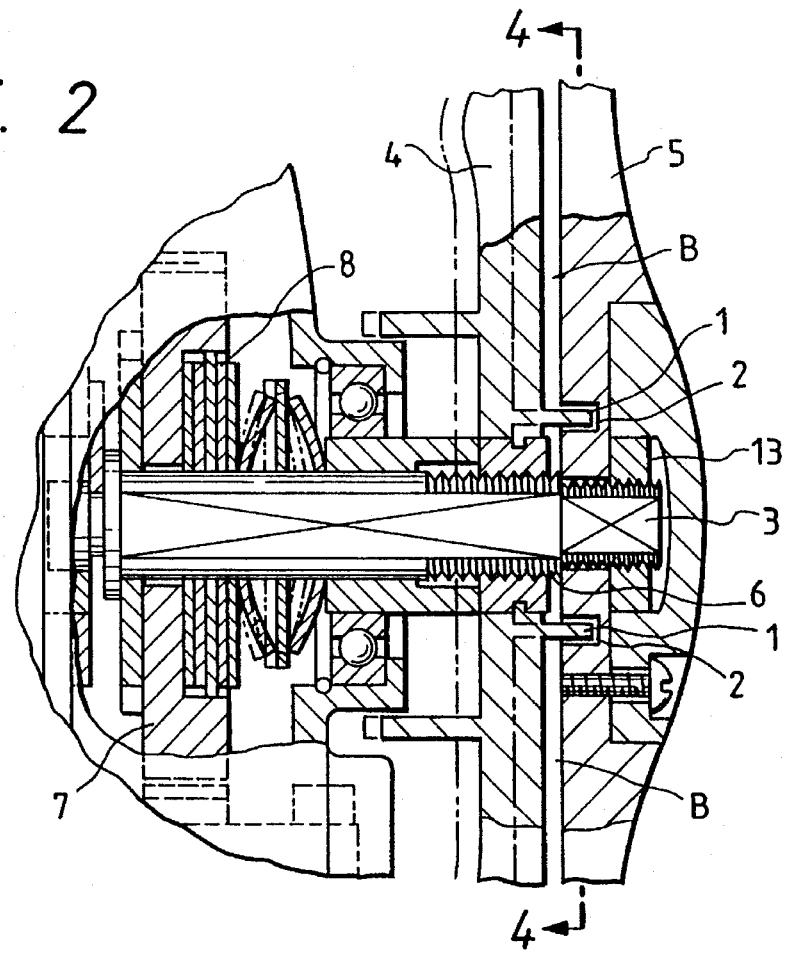
FIG. 2 is an enlarged sectional plan view of the main portions of the first embodiment shown in FIG. 1.
Figure 4:
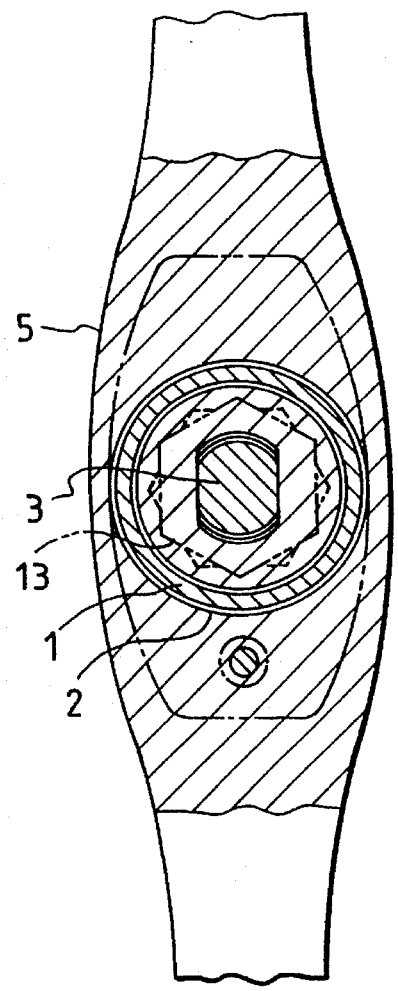
FIG. 4 is a sectional front view of the first embodiment shown in FIG. 2, taken along the line 4—4 in the same figure.

FIGS. 1, 2 and 4 respectively show a first embodiment of a brake device for a fishing reel according to the invention.

A spool 9 is provided in a reel main body in such a manner that it can be freely rotated through a spool shaft 10. A pinion 11 is slidably fitted on the spool shaft 10, a drive gear 7 in mesh with the pinion 11 is fitted on the outer periphery of a handle shaft 3, and a brake member 8 included in a drag mechanism is fitted on the handle shaft 3, so that, if the brake member 8 is pushed by an adjusting member 4 in threaded engagement with the handle shaft 3, then the drag brake force of the present brake device can be adjusted.

Further, the adjusting member 4 includes an integral cylindrical portion 1 which is extended axially from the adjusting member 4 toward the handle 5, while an annular recessed portion 2 is formed in the handle 5 which is mounted on a portion of the handle shaft 3 located outside the threaded part for the adjusting member 4. The handle shaft 5 is prevented against removal from the handle shaft 3 by a fitting nut 13. The cylindrical portion 1 formed in the adjusting member 4 can be rotatably fitted into the annular recessed portion 2 in such a manner as shown in FIG. 4.

Since the first embodiment of the present invention is structured in the above-mentioned manner, if the handle 5 is rotationally operated, then the handle shaft 3 is rotated integrally and in the same direction and, at the same time, the drive gear 7 in frictional connection with the brake member 8 is also rotated in the same direction. And, the rotation thereof is transmitted to the spool 9 through the pinion 11, spool shaft 10 and the like, so that a fishline can be taken up around the spool 9.

If the adjusting member 4 is rotationally operated in a direction to press against the brake member 8 or to relieve the pressure thereof, then the pressure of contact between the brake member 8 and drive gear 7 in frictional connection with each other can be varied to thereby adjust the brake force of the present brake device.

During the above operation, a gap B, through which a threaded portion 6 between the handle 5 and the adjusting member 4 is exposed, is increased in size when the adjusting member 4 is rotationally operated in the direction to press against the brake member 8. However, according to the present embodiment, since the cylindrical portion 1 of the adjusting member 4 is rotatably fitted into and contacted closely with the annular recessed portion 2 of the handle 5, there is eliminated the possibility that the threaded portion 6 can be exposed.

Further, since the annular recessed portion 2 is so set as to have a sufficient depth to cover the quantity of the axial movement of the adjusting member 4 on the handle shaft 3 due to the rotational operation of the adjusting member 4, the threaded portion 6 is always prevented from being exposed during the use of the reel and thus can be covered completely. That is, according to the first embodiment of the invention, by use of the above-mentioned simple structure it is possible to prevent entrance and sticking of foreign matter such as seawater, refuse, sand and the like onto the threaded portion 6 to thereby surely maintain the smooth adjusting operation of the brake force.

Figure 3:
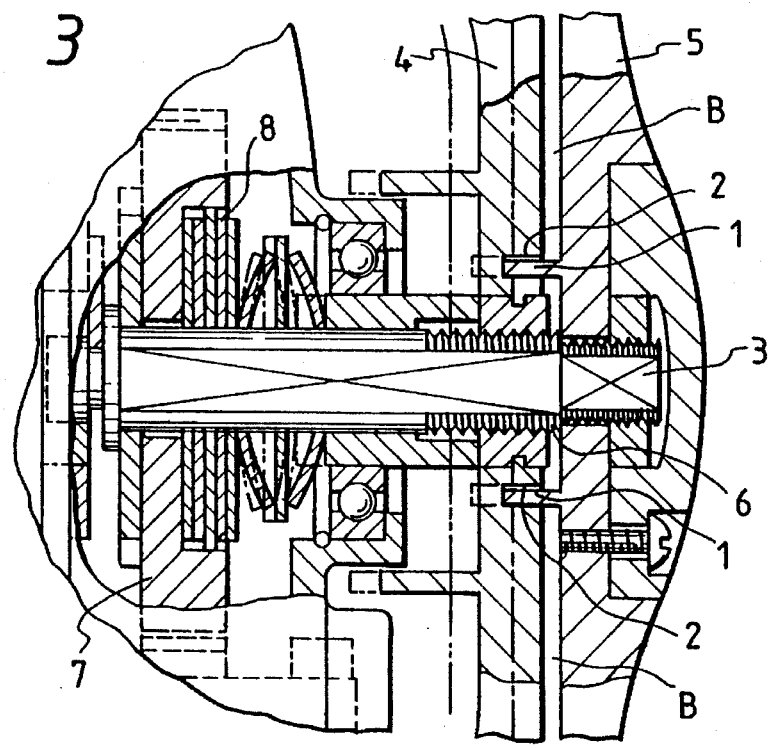
FIG. 3 is an enlarged sectional plan view of the main portions of a brake device for a fishing reel according to a second embodiment of the invention.

Now, FIG. 3 is an enlarged plan view of the main portions of a brake device for a fishing reel according to a second embodiment of the invention.

According to the second embodiment of the invention, in contrast to the first embodiment, the handle 5 is so arranged as to include a cylindrical portion 1 which is extended integrally therefrom, while an annular recessed portion is formed in the adjusting member 4.

In the second embodiment as well, the fitting state of the cylindrical portion 1 into the annular recessed portion 2 is similar to the fitting state provided in the first embodiment and, therefore, all the time during use of the reel, the threaded portion 6 is completely covered to thereby eliminate the possibility that foreign matter such as seawater, refuse, sand and the like can enter through the gap B to stick to the interior of the brake device.

Figure 5A:
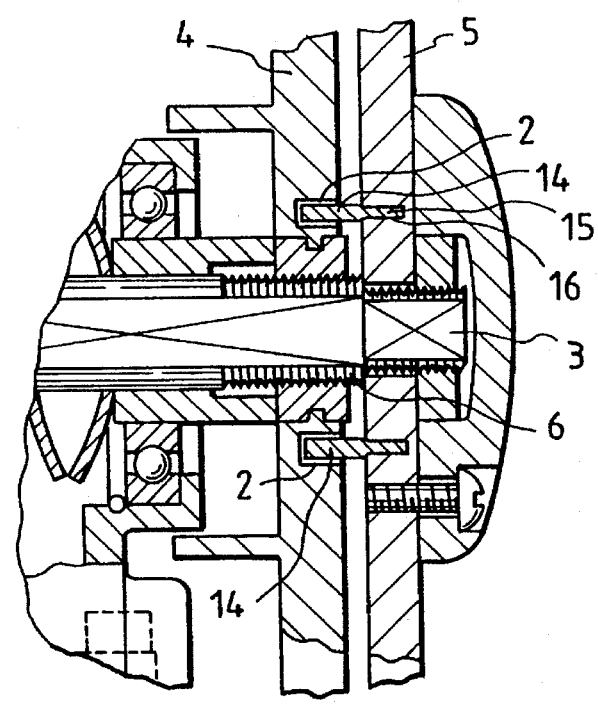
Figure 5B:
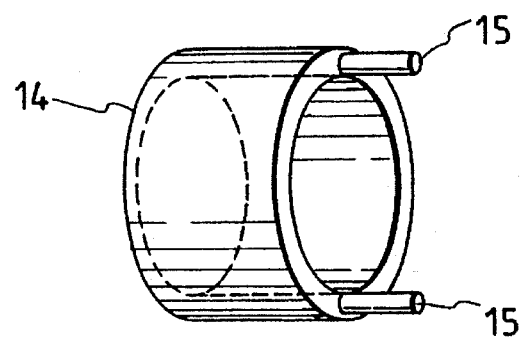
Figure 6:
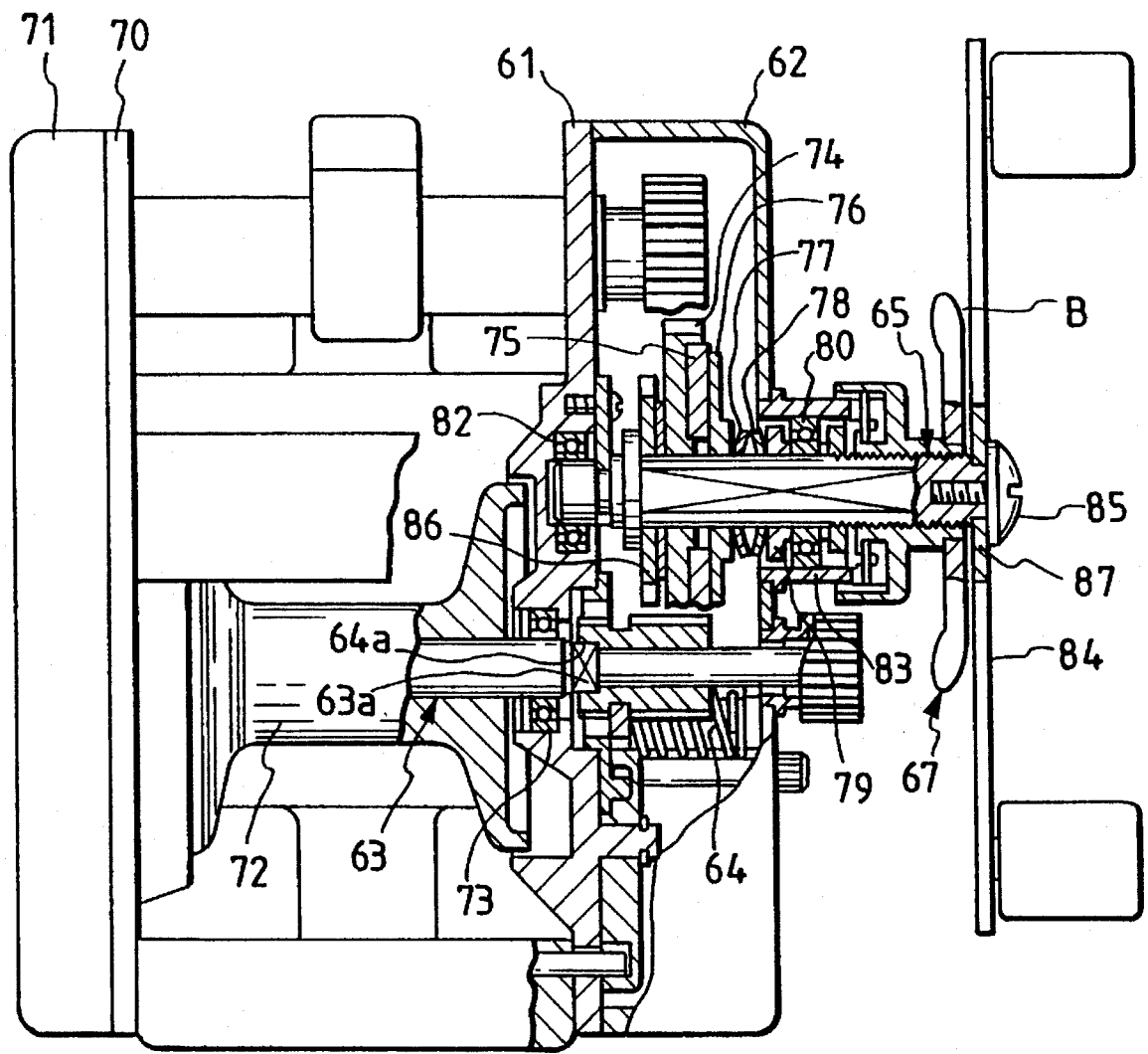
FIG. 6 is a sectional plan view of the main portions of a conventional double bearing type reel for fishing.

Now, FIGS. 5A and 5B show a brake device for a fishing reel according to a third embodiment of the invention.

As described before, in the previous embodiment, the cylindrical portion 1 is formed in the handle 5 in such a manner that it is integrally extended from the handle 5. On the other hand, in the third embodiment, a cylindrical member 14, which is formed separately from the handle 5 and includes a main body having the same shape as the above-mentioned cylindrical portion 1 and also includes a projecting portion 15 for fixing, is attached to the handle 5 in such a manner that the projecting portion 15 is inserted into a cylindrical member fixing hole 16 formed in the handle 5. After then, the cylindrical member 14 is integrally fixed to the handle 5 by staking or adhesion. To receive the cylindrical member 14, the annular recessed portion 2 is formed in the adjusting member 4.

The fitting state of the cylindrical member 14 of the handle 5 into the annular recessed portion 2 of the adjusting member 4 is similar to that in the previous embodiment and the covering effect of the threaded portion 6 is also similar.

According to the third embodiment, only the cylindrical member 14 for covering may be newly molded, whereas the conventional handle and adjusting member can be machined and used as they are.

As has been described heretofore, according to the invention, the cylindrical portion is formed in one of the handle and the adjusting member to be threadedly engaged with the handle shaft, on the outer end portion of which the handle is to be mounted, in such a manner that it is extended axially and integrally therewith, while the annular recessed portion into which the cylindrical portion can be fitted is formed in the other, so that the threaded portion of the handle shaft between the handle and adjusting member can be covered in such a manner that it is not exposed. Due to this, even when using the present brake device under a severe fishing condition, the brake device is able to prevent foreign matter such as seawater, refuse, sand and the like from sticking to the brake device by means of a simple structure, so that the brake force can be always adjusted smoothly.

Further, in case where the separately molded cylindrical member is fixed to one of the handle and adjusting member, and the annular recessed portion into which the cylindrical member can be fitted is formed in the other, not only sticking of foreign matter such as seawater, refuse, sand and the like can be prevented but also the number of the molded parts can be reduced to thereby reduce the cost of the product.

What is claimed is:

1. A brake device for a fishing reel comprising:

a handle shaft rotatably supported on a reel main body;

a handle mounted on an outer end of said handle shaft;

coupling means for frictionally coupling said handle shaft to a spool to rotate said spool by operation of said handle, said coupling means including a drive gear frictionally connected to said handle shaft through a brake member;

an adjuster provided between said handle and coupling means and threaded on said handle shaft for adjusting the magnitude of depression of said brake member against said drive gear;

a cylindrical portion formed on one of said handle and said adjuster to extend along said handle shaft; and an annular recessed portion formed in the other of said handle and said adjuster, said annular recessed portion receiving said cylindrical portion so that said cylindrical portion covers a portion of said handle shaft extending between said handle and said adjuster.

2. A brake device for a fishing reel according to claim 1, wherein said cylindrical portion is formed as an integral portion of said one of said handle and said adjuster.

3. A brake device for a fishing reel according to claim 1, wherein said cylindrical portion is formed as a separate member to be fixed onto said one of said handle and said adjuster.

4. A brake device for a fishing reel according to claim 1, said cylindrical portion is slidably and rotatably fitted into said recessed portion.

5. A brake device for a fishing reel according to claim 1, wherein said cylindrical portion circumscribes said portion of said handle shaft.

* * * * *